US008548802B2

(12) United States Patent
Nakadai et al.

(10) Patent No.: US 8,548,802 B2
(45) Date of Patent: Oct. 1, 2013

(54) ACOUSTIC DATA PROCESSOR AND ACOUSTIC DATA PROCESSING METHOD FOR REDUCTION OF NOISE BASED ON MOTION STATUS

(75) Inventors: Kazuhiro Nakadai, Wako (JP); Ince Gokhan, Wako (JP); Hiroshi Tsujino, Wako (JP); Tobias Rodemann, Offenbach/Main (DE)

(73) Assignee: Honda Motor Co., Ltd., Tokyo (JP)

( * ) Notice: Subject to any disclaimer, the term of this patent is extended or adjusted under 35 U.S.C. 154(b) by 574 days.

(21) Appl. No.: 12/784,119

(22) Filed: May 20, 2010

(65) Prior Publication Data

US 2010/0299145 A1 Nov. 25, 2010

Related U.S. Application Data

(60) Provisional application No. 61/213,277, filed on May 22, 2009.

(30) Foreign Application Priority Data

Apr. 26, 2010 (JP) ................................. 2010-101023

(51) Int. Cl.
*G10L 11/04* (2006.01)
(52) U.S. Cl.
USPC ........................................................ 704/207
(58) Field of Classification Search
USPC .................................. 704/207–209, 270–277
See application file for complete search history.

(56) References Cited

U.S. PATENT DOCUMENTS 6,295,484 B1 * 9/2001 Ojima et al. ................. 700/245
6,324,502 B1 * 11/2001 Handel et al. ................ 704/226
6,683,968 B1 * 1/2004 Pavlovic et al. .............. 382/103
7,215,786 B2 * 5/2007 Nakadai et al. .............. 381/94.1
2002/0158599 A1 * 10/2002 Fujita et al. ............... 318/568.11
2003/0233170 A1 * 12/2003 Ohtani et al. ................. 700/245
2006/0136203 A1 * 6/2006 Ichikawa ..................... 704/226
2008/0071540 A1 * 3/2008 Nakano et al. ............... 704/251

FOREIGN PATENT DOCUMENTS

JP 2008-122927 5/2008

OTHER PUBLICATIONS

Isao Hara et al., Robust Speech Interface Based on Audio and Video Information Fusion for Humanoid HRP-2, Proceedings of 2004 IEEE/RSJ International Conference, Sep. 28-Oct. 2, 2004, pp. 2404-2410.
Steven Boll, Suppression of Acoustic Noise in Speech Using Spectral Substraction, IEEE Transactions on Acoustics, Speech, and Signal Processing, vol. ASSP-27, No. 2, Apr. 1979, pp. 113-120.

(Continued)

*Primary Examiner* — Michael N Opsasnick
(74) *Attorney, Agent, or Firm* — Squire Sanders (US) LLP

(57) ABSTRACT

An acoustic data processor according to the present invention is used for processing acoustic data including signal sounds to reduce noises generated by a mechanical apparatus. The acoustic data processor includes a motion status obtaining section for obtaining motion status of the mechanical apparatus, an acoustic data obtaining section for obtaining acoustic data corresponding to the obtained motion status, and a database for storing various motion statuses of the mechanical apparatus in a unit time and corresponding acoustic data as templates. The acoustic data processor further includes a database searching section for searching the database to retrieve the template having the motion status closest to the obtained motion status; and a template subtraction section for subtracting the acoustic data of the template having the motion status closest to the obtained motion status from the obtained acoustic data to reduce noises generated by the mechanical apparatus.

10 Claims, 8 Drawing Sheets

(56) References Cited

OTHER PUBLICATIONS

Israel Cohen et al., Noise Estimation by Minima Controlled Recursive Averaging for Robust Speech Enhancement, IEEE Signal Processing Letters, vol. 9, No. 1, Jan. 2002, pp. 12-15.

Lucas Parra et al., Geometric Source Separation: Merging Convolutive Source Separation with Geometric Beamforming, IEEE Transactions on Speech and Audio Processing, vol. 10, No. 6, Sep. 2002, pp. 352-362.

* cited by examiner

FIG. 3

| MOTION STATUS (FEATURE VECTOR) | ACOUSTIC DATA (FREQUENCY SPECTRUM) |
|---|---|
| $\theta j(1), \dot{\theta} j(1), \ddot{\theta} j(1)$ | $D(1,1), D(2,1) \cdots D(F,1)$ |
| ⋮ | ⋮ |
| $\theta j(k), \dot{\theta} j(k), \ddot{\theta} j(k)$ | $D(1,k), D(2,k) \cdots D(F,k)$ |
| ⋮ | ⋮ |

ACOUSTIC DATA PROCESSOR AND ACOUSTIC DATA PROCESSING METHOD FOR REDUCTION OF NOISE BASED ON MOTION STATUS

BACKGROUND OF THE INVENTION

1. Field of the Invention

The present invention relates to an acoustic data processor and an acoustic data processing method for processing acoustic data containing signal sounds to reduce noises generated by a mechanical apparatus such as a robot.

2. Background Art

For example, a robot which performs automatic speech recognition while moving has to be provided with ability to suppress noises caused by its own motion, that is, ego-noises (for example, Japanese patent application laid open 2008-122927).

In general, sound source localization and sound source separation have been studied to reduce noises. However, automatic speech recognition under ego-noise is not mainly addressed (for example, I. Hara, F. Asano, H. Asoh, J. Ogata, N. Ichimura, Y. Kawai, F. Kanehiro, H. Hirukawa, and K. Yamamoto, "Robust speech interface based on audio and video information fusion for humanoid HRP-2" in Proc. IEEE/RSJ International Joint Conference on Robots and Intelligent Systems (IROS), pp. 2404-2410, (2004)). Conventional noise reduction methods such as spectral subtraction do not function successfully in many actual cases (for example, S. Boll, "Suppression of Acoustic Noise in Speech Using Spectral Subtraction", in IEEE Transactions on Acoustics, Speech, and Signal Processing, vol. ASSP-27, No. 2, (1979)). Further, there is a method in which spectral subtraction is performed for each behavior. However, it is practically unfeasible to handle various kinds of behaviors. Besides, ego-noise sources exist in the near-field of the robot and thus the performance of the conventional far-field noise reduction solutions drops considerably.

Thus, an acoustic data processor and an acoustic data processing method for processing acoustic data containing signal sounds to reduce noises generated by a mechanical apparatus, such as ego-noises of a robot, have not been developed.

Accordingly, there is a need for an acoustic data processor and an acoustic data processing method for processing acoustic data containing signal sounds to reduce noises generated by a mechanical apparatus, ego-noises of a robot, for example.

SUMMARY OF THE INVENTION

An acoustic data processor according to the first aspect of the present invention is used for processing acoustic data including signal sounds to reduce noises generated by a mechanical apparatus. The acoustic data processor according to the aspect includes a motion status obtaining section for obtaining motion status of the mechanical apparatus, an acoustic data obtaining section for obtaining acoustic data corresponding to the obtained motion status, and a database for storing various motion statuses of the mechanical apparatus in a unit time and corresponding acoustic data as templates. The acoustic data processor according to the aspect further includes a database searching section for searching the database to retrieve the template having the motion status closest to the obtained motion status; and a template subtraction section for subtracting the acoustic data of the template having the motion status closest to the obtained motion status from the obtained acoustic data to reduce noises generated by the mechanical apparatus.

In the acoustic data processor according to the aspect of the present invention, acoustic data of the template having the motion status closest to the obtained motion status among templates representing acoustic data corresponding to various motion statuses of the mechanical apparatus in a unit time is used as a predicted value of the acoustic data of the obtained motion status. Accordingly, noises generated by the mechanical apparatus can be reduced efficiently depending on motion status by subtracting the predicted value from the obtained acoustic data.

An acoustic data processor according to an embodiment of the present invention further includes a multi-channel noise reduction section for reducing noise based on multi-channel acoustic data and an output selecting section for selecting one between output of the template subtraction section and output of the multi-channel noise reduction section based on the obtained motion status.

According to the embodiment, between output of the template subtraction section and output of the multi-channel noise reduction section, one of which noises have been reduced more effectively reduced than the other can be selected depending on the obtained motion status.

In an acoustic data processor according to an embodiment of the present invention, the mechanical apparatus is a robot.

According to the embodiment, noises generated by the robot depending on motion statuses of the robot can be reduced efficiently.

In an acoustic data processor according to an embodiment of the present invention, motion status of the robot is represented by data of angle, angular velocity and angular acceleration of joint motors.

According to the embodiment, motion status of the robot can be grasped easily and without fail using data of angle, angular velocity and angular acceleration of joint motors.

In an acoustic data processor according to an embodiment of the present invention, the template having the motion status closest to the obtained motion status is determined using distance in 3J dimensional space consisting of data of angle, angular velocity and angular acceleration of motors where J is the number of the motors.

According to the embodiment, the template having the motion status closest to the obtained motion status can be determined easily and without fail using distance in the 3J dimensional space.

In an acoustic data processor according to an embodiment of the present invention, acoustic data of the templates are represented by frequency spectrum.

According to the embodiment, data can be efficiently stored by representing acoustic data by frequency spectrum.

An acoustic data processor according to an embodiment of the present invention further includes a database generating section for generating the database by collecting various motion statuses in a unit time and acoustic data corresponding to the motion statuses.

According to the embodiment, work load for generating the database can be remarkably reduced.

An acoustic data processor according to an embodiment of the present invention is used for speech recognition.

According to the embodiment, speech recognition can be performed with higher accuracy even when ego-noise exists.

An acoustic data processing method according to the second aspect of the present invention, is used for processing acoustic data including signal sounds to reduce noises generated by a mechanical apparatus. The acoustic data processing method according to the aspect includes the steps of obtaining motion status of the mechanical apparatus and of obtaining acoustic data corresponding to the obtained motion status. The acoustic data processing method according to the aspect further includes the steps of retrieving the template having the motion status closest to the obtained motion status from a database for storing various motion statuses of the mechanical apparatus in a unit time and corresponding acoustic data as templates and of subtracting the acoustic data of the template having the motion status closest to the obtained motion status from the obtained acoustic data to obtain output of which noises generated by the mechanical apparatus are reduced.

In the acoustic data processing method according to the aspect of the present invention, acoustic data of the template having the motion status closest to the obtained motion status among templates representing acoustic data corresponding to various motion statuses of the mechanical apparatus in a unit time is used as a predicted value of the acoustic data of the obtained motion status. Accordingly, noises generated by the mechanical apparatus can be reduced efficiently depending on motion status by subtracting the predicted value from the obtained acoustic data.

An embodiment of the present invention further includes the step of selecting one between output of which noise has been reduced by template subtraction and output of which noise has been reduced using multi-channel acoustic data.

According to the embodiment, between output of the template subtraction section and output of the multi-channel noise reduction section, one of which noises have been reduced more effectively reduced than the other can be selected depending on the obtained motion status.

BRIEF DESCRIPTION OF THE DRAWINGS

FIG. 3 illustrates a structure of the database;

DETAILED DESCRIPTION OF THE INVENTION

Figure 1:
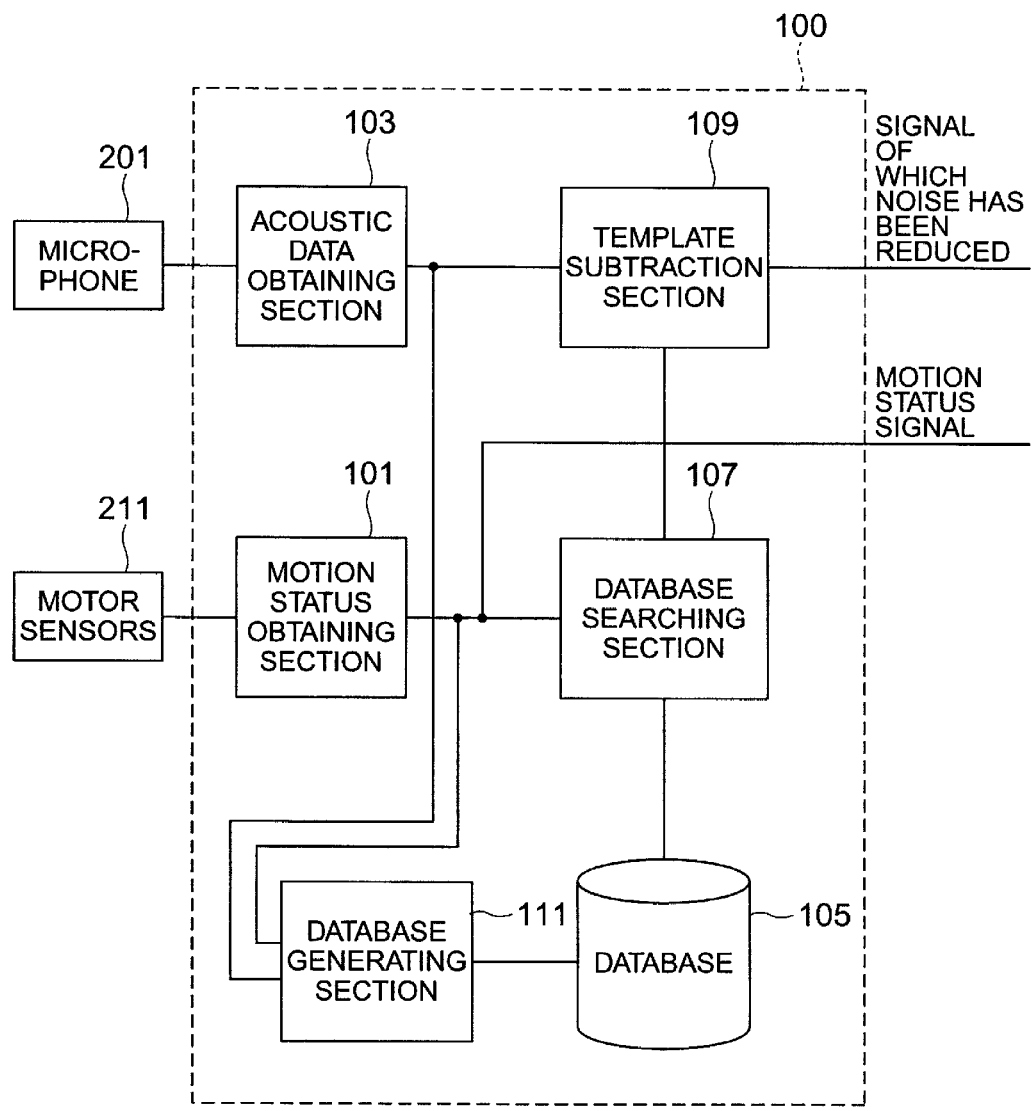
FIG. 1 illustrates a configuration of a template subtraction noise reduction section of an acoustic data processor according to an embodiment of the present invention.

FIG. 1 illustrates a configuration of a template subtraction noise reduction section 100 of an acoustic data processor according to an embodiment of the present invention. In the present embodiment a mechanical apparatus is a robot. The template subtraction noise reduction section 100 includes a motion status obtaining section 101 for obtaining motion statuses of the robot, an acoustic data obtaining section 103 for obtaining acoustic data containing signals and noises, a database 105 for storing various motion statuses of the robot and corresponding acoustic data in a unit time as templates, and a database generating section 111. A template represents acoustic data (acoustic signal) generated in each of various motion statuses of the robot in a unit time. The template subtraction noise reduction section 100 further includes a database searching section 107 for searching the database to retrieve a template which has the motion status closest to the obtained motion status and a template subtraction section 109 for subtracting the acoustic data in the template which has the motion status closest to the obtained motion status from the obtained acoustic data to reduce noise generated by the mechanical apparatus.

The motion status obtaining section 101 is connected to angular sensors of the joint motors of the robot to obtain angular data from the angular sensors. Motion status of the robot is represented by data of angle, angular velocity and angular acceleration of the joint motors of the robot. The motion status obtaining section 101 obtains data of angular velocity and data of angular acceleration by differential operation of the obtained data of angle.

The acoustic data obtaining section 103 is connected to microphones 201 set on the robot to obtain acoustic data collected by the microphones 201. The acoustic data obtaining section 103 may be provided with background noise reduction ability using MCRA (I. Cohen, "Noise Estimation by Minima Controlled Recursive Averaging for Robust Speech Enhancement, in IEEE Transactions on Acoustics, Speech, and Signal Processing, vol. ASSSP-27, No. 2, (1979)) or the like.

Data structure of the database 105, function of the database generating section 111, function of the database searching section 107 and function of the template subtraction section 109 will be described in detail later.

Figure 2:
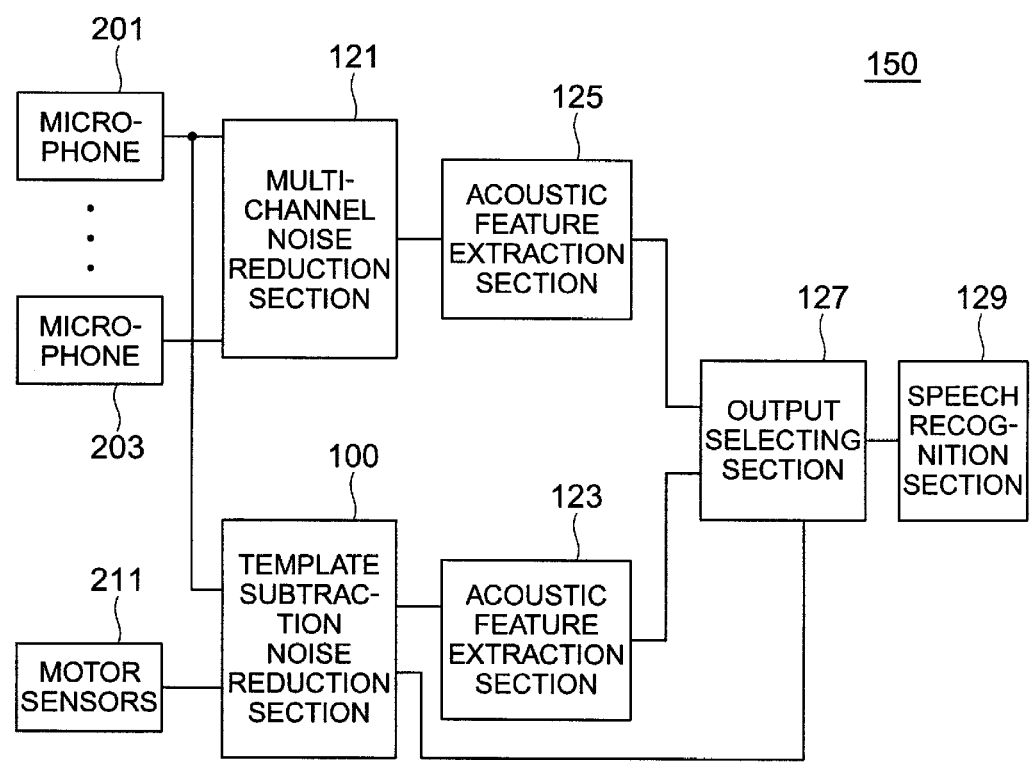
FIG. 2 illustrates a configuration of an acoustic data processor according to an embodiment of the present invention.

FIG. 2 illustrates a configuration of an acoustic data processor 150 according to an embodiment of the present invention. The acoustic data processor 150 includes the template subtraction noise reduction section 100 described with reference to FIG. 1, a multi-channel noise reduction section 121 for reducing noise using the conventional geometric source separation method (Geometric Source Separation, GSS, L. C. Parra and C. V. Alvino, "Geometric Source Separation: Merging Convolutive Source Separation with Geometric Beamforming", in IEEE Trans. Speech Audio Process., vol. 10, No. 6, pp. 352-362, (2002)), acoustic feature extraction sections 123 and 125 for extracting acoustic features from acoustic data which have been processed for noise reduction, an output selecting section 127 for selecting one between output of the template subtraction noise reduction section 100 and output of the multi-channel noise reduction section 121, and a speech recognition section 129 for performing speech recognition using the selected output.

The multi-channel noise reduction section 121 obtains acoustic data from 8 microphones 201, . . . 203 set on the head of the robot, localizes sound sources and performs sound source separation using the localized sound sources. Then, the multi-channel noise reduction section 121 performs post-filtering operation. The post-filtering operation attenuates stationary noise, for example background noise, and non-stationary noise that arises because of the leakage energy between the output channels of the previous separation stage for each individual sound source. The multi-channel noise reduction section 121 may be implemented by any other multi-channel system capable of separating directional sound sources than the system described above.

The output selecting section 127 receives data of motion status of the robot from the motion status obtaining section 101 of the template subtraction noise reduction section 100. Then, based on the data, the output selecting section 127 selects output of one that reduces noise more efficiently than the other in the motion status between the template subtraction noise reduction section 100 and the multi-channel noise reduction section 121 and sends the selected output to the speech recognition section 129. A relationship between motion status of the robot and performance of the template subtraction noise reduction section 100 and the multi-channel noise reduction section 121 will be described later.

FIG. 3 illustrates a structure of the database 105.

Figure 4:
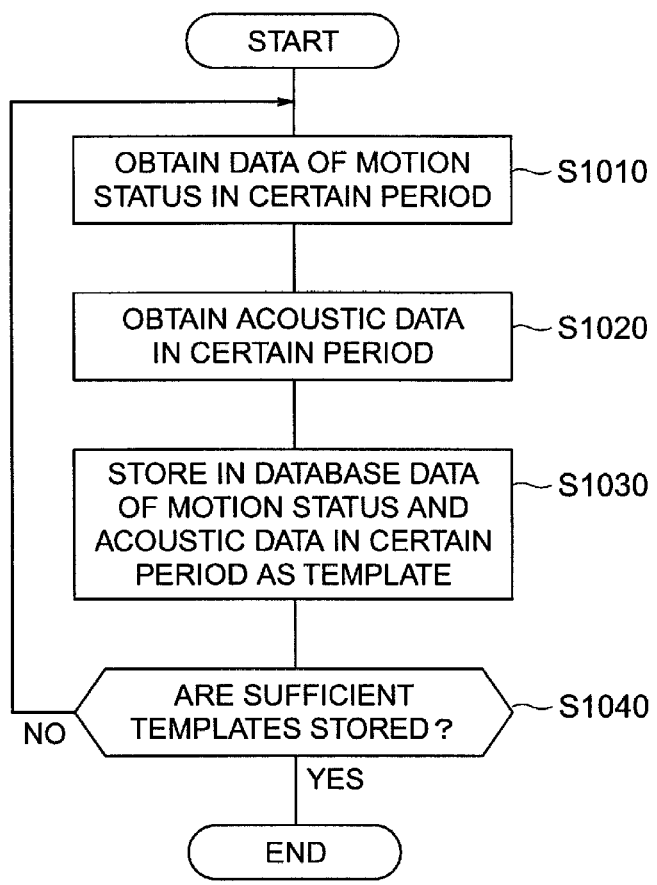
FIG. 4 is a flowchart showing a procedure of generating the database.

FIG. 4 is a flowchart showing a procedure of generating the database 105. While the database 105 is being generated, the robot carries out a sequence of motions with a pause of less than 1 second between individual motions. Meanwhile, the motion status obtaining section 101 obtains motion statuses and the acoustic data obtaining section 103 obtains acoustic data. "Arm motion" is random whole-arm pointing behavior in the reaching space. "Leg motion" is stamping behavior and short distance walking. "Head motion" is random head rotation (elevation=[−30°,30°], azimuth=[−90°,90°]). In step S1010, the motion status obtaining section 101 obtains motion status of the robot in a predetermined time period.

As described above, motion status of the robot is represented by data of angle $\theta$, angular velocity $\dot{\theta}$ and angular acceleration $\ddot{\theta}$ of the joint motors of the robot. Assuming that the number of the joints of the robot is J, feature vector representing motion status is as below.

$$[\theta_1(k),\dot{\theta}_1(k),\ddot{\theta}_1(k), \ldots, \theta_J(k),\dot{\theta}_J(k),\ddot{\theta}_J(k)]$$

"k" represents time. Values of angle $\theta$, angular velocity $\dot{\theta}$ and angular acceleration $\ddot{\theta}$ are obtained every 5 milliseconds and normalized in [1,1].

The robot uses two motors for motion of the head, 5 motors for motion of each leg and 4 motors for motion of each arm. Thus, a total of 20 motors are used in the robot and therefore J is 20.

In step S1020 of FIG. 4, the acoustic data obtaining section 103 obtains acoustic data in the predetermined time period. Specifically, the acoustic data corresponding to the above-described motion status of the robot, that is, the acoustic data corresponding to motor noise in the motion status is obtained. The obtained acoustic data is represented as below.

$$[D(1,k),D(2,k), \ldots, D(F,k)]$$

"k" represents time while "F" represents frequency range. Each frequency range is obtained by dividing the range from 0 kHz to 8 kHz into 256 sections. Acoustic data are obtained every 10 milliseconds. As described above, the acoustic data obtaining section 103 may use data of which noises have been reduced using MCRA, for example, as acoustic data.

In step S1030 of FIG. 4, the database generating section 111 receives feature vector representing motion status $$[\theta_1(k),\dot{\theta}_1(k),\ddot{\theta}_1(k), \ldots, \theta_J(k),\dot{\theta}_J(k),\ddot{\theta}_J(k)]$$

from the motion status obtaining section 101 and frequency spectrum corresponding to the motion status $$[D(1,k),D(2,k), \ldots, D(F,k)]$$

from the acoustic data obtaining section 103.

A time tag is attached to the feature vector representing motion status and the frequency spectrum of acoustic data. Thus, a template is generated by combining the feature vector and the frequency spectrum that have the same time tag. The database 105 shown in FIG. 3 is a collection of templates thus generated. As described above, a period of the feature vector representing motion status is 5 milliseconds and therefore a period of the template is also 5 milliseconds.

In the present invention a database is constructed by collecting a number of templates each of which represents acoustic data (acoustic signal) generated in one of motion statuses in a unit time (5 milliseconds in the case described above). Then, during operation of the robot, the acoustic data in the template stored in the database, the motion status of which is closest to the motion status obtained at a certain time period is used as a predicted value of acoustic data of the motion status obtained at the time period. Thus, the present invention is based on the idea that acoustic data in any motion status of the robot can be predicted using a collection of a number of templates each of which represents acoustic data (acoustic signal) generated in one of motion statuses in a unit time (5 milliseconds in the case described above). This idea is based on the following assumptions.

1) Current motor noise depends on position, velocity and acceleration of that specific motor.
2) At any time similar combinations of joint status will result in similar frequency spectrum of noise.
3) The superposition of single joint motor noises at any particular time equals to the whole body noise at that specific time instance.

In step S1040 of FIG. 4, it is determined whether sufficient templates have been stored in the database 105. For example, it may be determined that sufficient templates have been stored in the database 105 after templates for a sequence of motions including a sequence of "arm motions", a sequence of "leg motions" and a sequence of "head motions" have been stored in the database 105.

According to the procedure described above, a database which can be used for prediction of acoustic data in any motion status of the robot can be easily generated.

Figure 5:
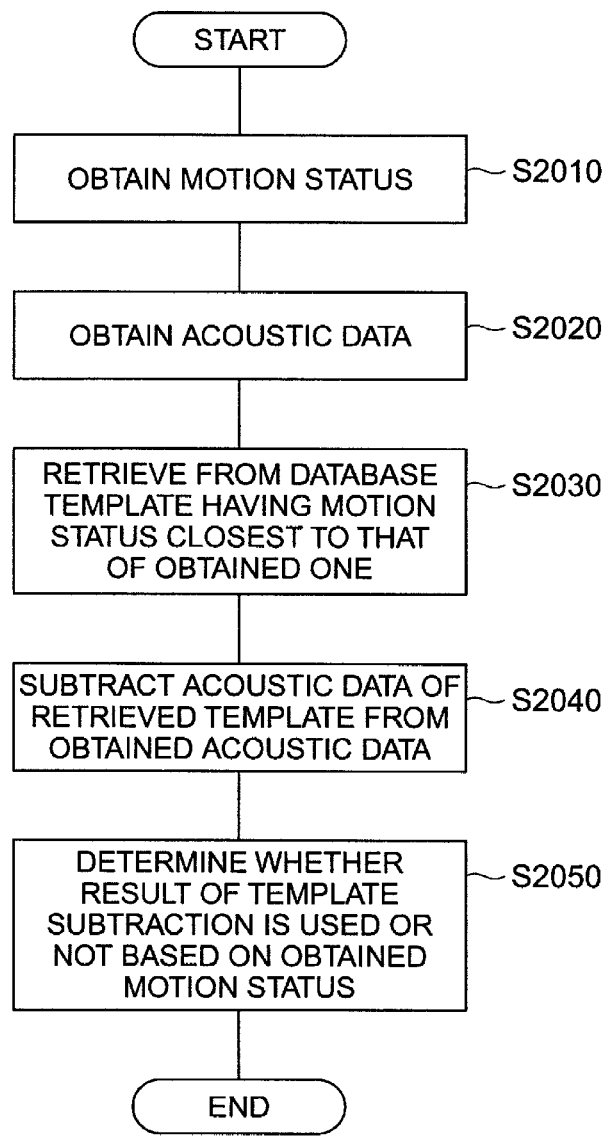
FIG. 5 is a flowchart showing a procedure of noise reduction with template subtraction.

FIG. 5 is a flowchart showing a procedure of noise reduction with template subtraction.

In step S2010 of FIG. 5, the motion status obtaining section 101 obtains motion status (feature vector) of the robot.

In step S2020 of FIG. 5, the acoustic data obtaining section 107 obtains acoustic data.

In step S2030 of FIG. 5, the database searching section 107 receives the obtained motion status (feature vector) from the motion status obtaining section 101 and retrieves the template having the motion status closest to the obtained motion status, from the database 105.

Assuming that the number of the joints of the robot is J, a feature vector of motion status corresponds to a point in the 3J dimensional space. Assume that the feature vector of motion status of an arbitrary template in the database 105 is represented as $$\vec{s}=(s_1,s_2, \ldots, s_{3J}),$$

while the feature vector of the obtained motion status is represented as $$\vec{q}=(q_1,q_2, \ldots, q_{3N}).$$

Then, to retrieve the template having the motion status closest to the obtained motion status is to obtain a template which has the feature vector $$\vec{s}=(s_1,s_2, \ldots, s_{3J})$$

which minimizes a distance $$d(\vec{q}, \vec{s}) = \|\vec{q} - \vec{s}\| = \sqrt{\sum_{i=1}^{3J}(q_i - s_i)^2} \quad (1)$$

in the 3J dimensional space.

In step S2040 of FIG. 5, the template subtraction section 109 receives the obtained acoustic data from the acoustic data obtaining section 103 and receives the frequency spectrum of the retrieved template. Then, the template subtraction section 109 subtracts the frequency spectrum of the template which is a predicted value of the motor noise from the frequency spectrum of the obtained acoustic data. When the frequency spectrum of the obtained acoustic data is represented as $X(\omega, k)$ while the frequency spectrum of the template is represented as $\hat{D}(\omega, k)$, the frequency spectrum of the effective signal $S_r(\omega, k)$ can be obtained by the following equation.

$$S_r(\omega, k) = X(\omega, k) - \hat{D}(\omega, k) \quad (2)$$

The frequency spectrum of the template $\hat{D}(\omega, k)$ is a predicted value of the motor noise and therefore the frequency spectrum of the effective signal $S_r(\omega, k)$ contains residual motor noise. Accordingly, template subtraction may be performed by the following equation.

$$\hat{H}_{SS}(\omega, k) = \max\left(1 - \alpha \frac{\hat{D}(\omega, k)}{X(\omega, k)}, \beta\right) \quad (3)$$

$$\tilde{S}(\omega, k) = X(\omega, k) \cdot \hat{H}_{SS}(\omega, k) \quad (4)$$

α is overestimation factor, which allows a compromise between perceptual signal distortion and noise reduction level. β is spectral floor, which reduces the effect of the sharp valleys and peaks. By way of example, the parameters are determined as below.

α=1
β=0.5

In step S2050 of FIG. 5, the output selecting section 127 receives data of motion status of the robot from the motion status obtaining section 101 of the template subtraction noise reduction section 100 and based on the data selects one between output of the template subtraction noise reduction section 100 and output of the multi-channel noise reduction section 121. Assuming that absolute velocity of the pan or tilt motion of the head is represented by $|\dot{\theta}_{HeadJo\,int}(k)|$, output of the template subtraction noise reduction section 100 may be selected if the expression $$|\dot{\theta}_{HeadJo\,int}(k)| > \epsilon \quad (5)$$

is held and output of the multi-channel noise reduction section 121 may be selected otherwise. The reason that output of the template subtraction noise reduction section 100 is selected when motion of the head exists will be described later. Constant $\epsilon$ is used in place of 0 in order to deal with the situation under which motion of the head has stopped, but the angular sensors of the joint motors still send signals caused by very small position differences. After having selected one of the outputs, the output selecting section 127 sends the selected output to the speech recognition section 129, and the speech recognition section 129 performs speech recognition.

Experiments of speech recognition using the acoustic data processor according to the embodiment will be described below. In the experiments, speech recognition was performed using the noise signal consisting of ego noise and background noise mixed with clean speech utterance. The Japanese word dataset including 236 words for 4 female and 4 male speakers was used for the speech utterance. The position of the speaker was kept fixed at the front (0 degree) thorough out the experiments. The recording environment was a room with the dimensions of 4.0 m×7.0 m×3.0 m with a reverberation time of 0.2 seconds. Speech recognition results are given as word correct rates (WCR).

Before mixing the noise with the speech utterance, the clean speech utterance was amplified based on segmental SNR segSNR which is represented as below.

$$segSNR = \frac{1}{J}\sum_{j=1}^{J} 10\log_{10}\left(\frac{\sum_n s_j^2(n)}{\sum_n d_j^2(n)}\right) \quad (6)$$

J represents the number of segments with speech activity while s(n) and d(n) are the n-th discrete speech and noise sample respectively.

Figure 6:
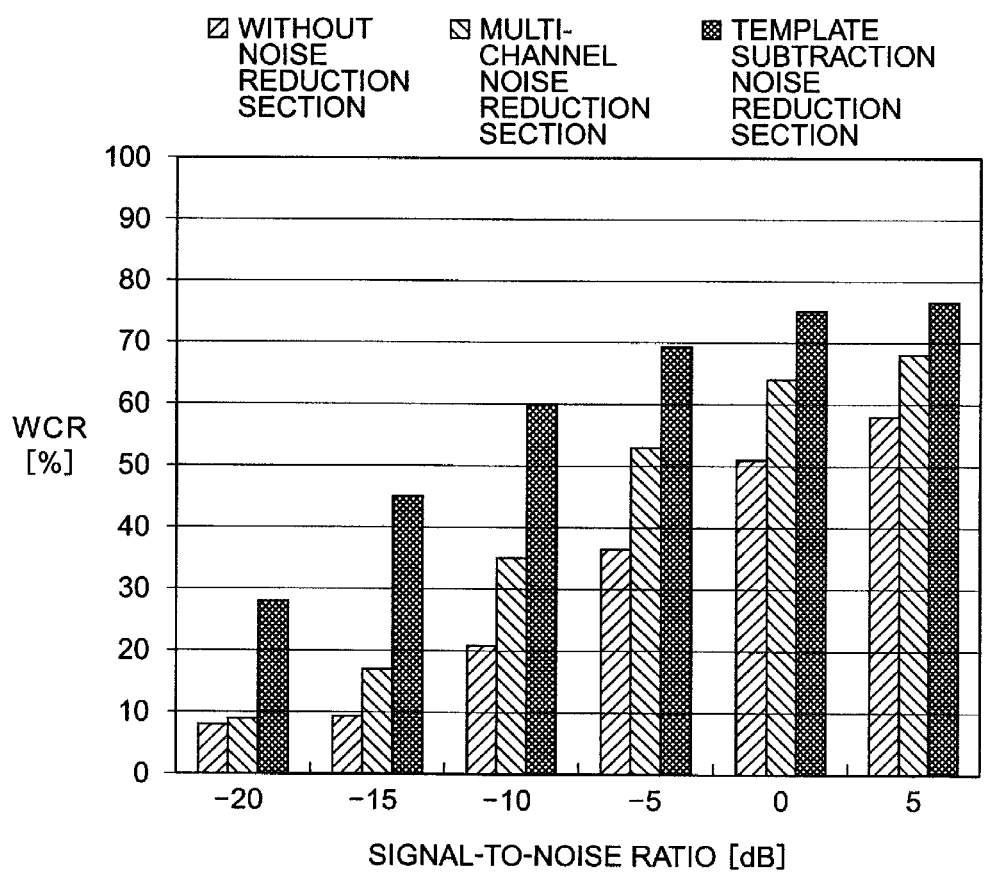
FIG. 6 shows a relationship between SN ratio (signal-to-noise ratio) and word correct rate (WCR) when "head motion" noise exists.

FIG. 6 shows a relationship between SN ratio (signal-to-noise ratio) and word correct rate (WCR) when "head motion" noise exists. In FIG. 6, WCR for the case without a noise reduction section, WCR for the case in which the multi-channel noise reduction section is used and WCR for the case in which the template subtraction noise reduction section is used are shown. At any SN ratio, WCR for the case in which the template subtraction noise reduction section is used is higher than those for the other two cases.

Figure 7:
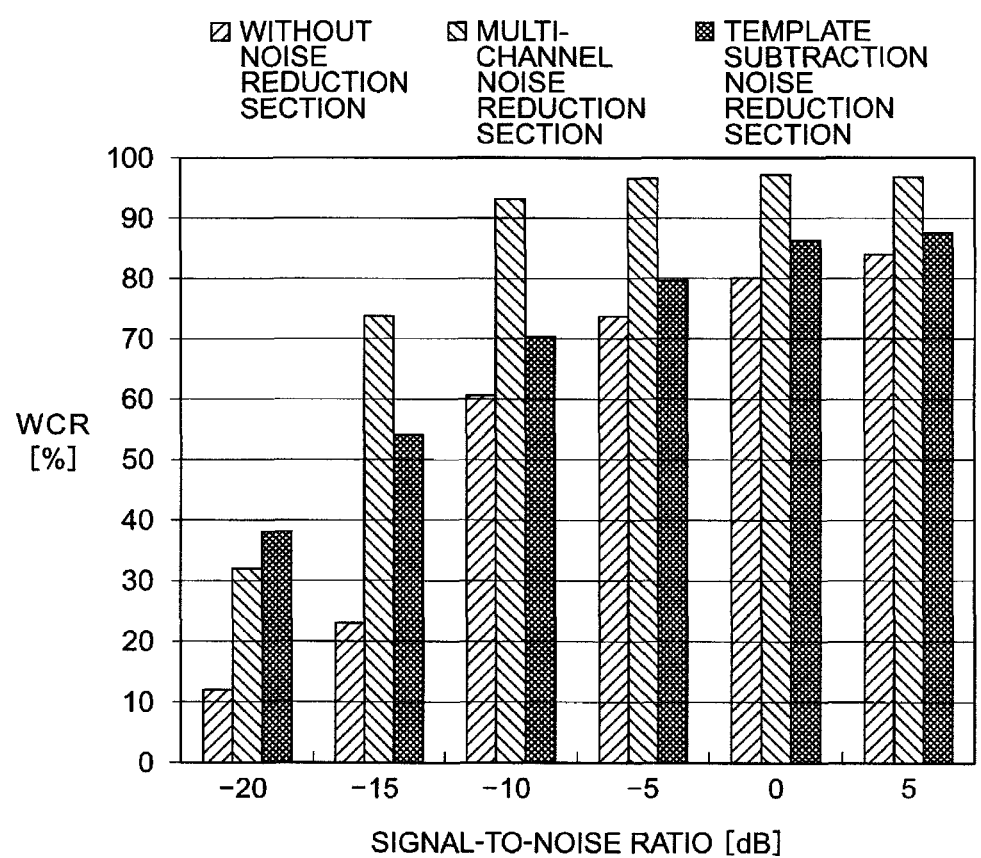
FIG. 7 shows a relationship between SN ratio (signal-to-noise ratio) and word correct rate (WCR) when "arm motion" noise exists.

FIG. 7 shows a relationship between SN ratio (signal-to-noise ratio) and word correct rate (WCR) when "arm motion" noise exists. In FIG. 7, WCR for the case without a noise reduction section, WCR for the case in which the multi-channel noise reduction section is used and WCR for the case in which the template subtraction noise reduction section is used are shown. At SN ratios except for the lowest SN ratio, WCR for the case in which the template subtraction noise reduction section is used is lower than that for the case in which the multi-channel noise reduction section is used.

Figure 8:
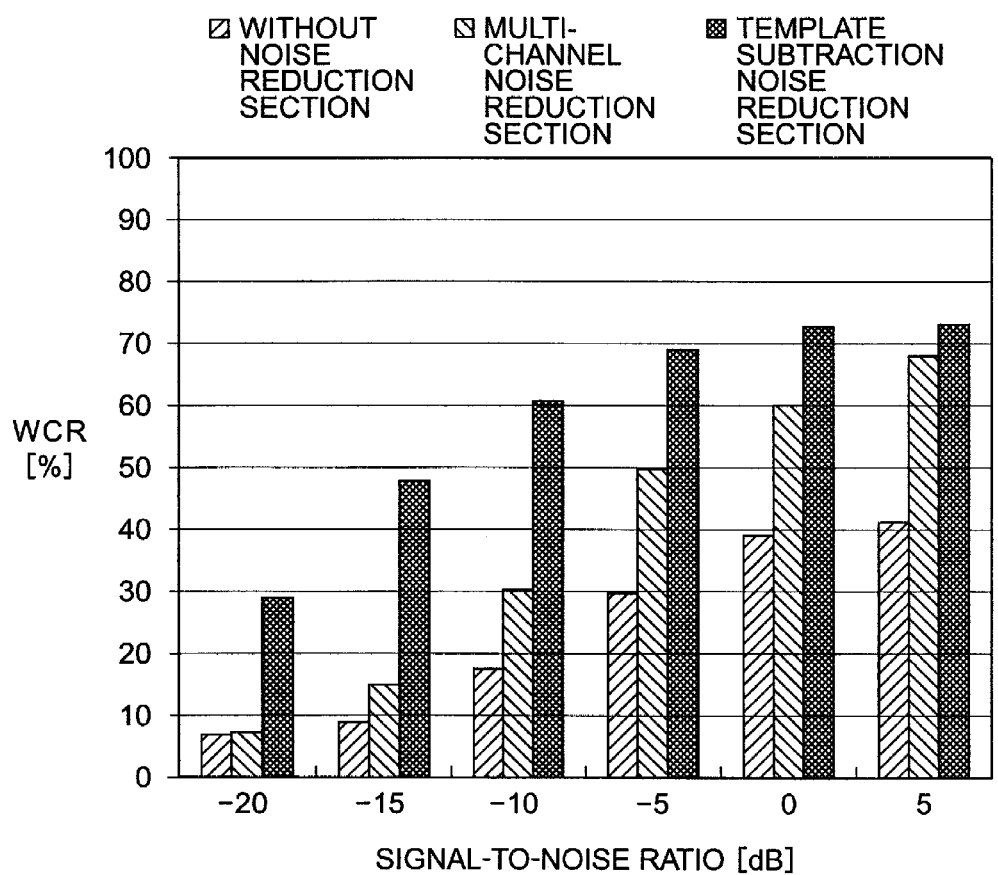
FIG. 8 shows a relationship between SN ratio (signal-to-noise ratio) and word correct rate (WCR) when "head motion" noise and "arm motion" noise exist.

FIG. 8 shows a relationship between SN ratio (signal-to-noise ratio) and word correct rate (WCR) when "head motion" noise and "arm motion" noise exist. In FIG. 8, WCR for the case without a noise reduction section, WCR for the case in which the multi-channel noise reduction section is used and WCR for the case in which the template subtraction noise reduction section is used are shown. At any SN ratio, WCR for the case in which the template subtraction noise reduction section is used is higher than those for the other two cases.

Table 1 shows WCR for the case without a noise reduction section, WCR for the case in which the multi-channel noise reduction section is used and WCR for the case in which the template subtraction noise reduction section is used are shown when various noises exist and SN ratio is −5 dB. Unit of WCR in Table 1 is percent.

TABLE 1

|  | Arm motion | Head motion | Head and arm motion |
|---|---|---|---|
| Without noise reduction section | 73 | 37 | 30 |
| Template subtraction noise reduction section | 80 | 69 | 69 |
| Multi-channel Noise reduction section | 96 | 53 | 50 |

As seen from FIGS. 6 to 8 and Table 1, when "head motion" noise exists and "head and arm motion" noise exists, WCR for the case in which the template subtraction noise reduction section is used is higher than WCR for the case in which the multi-channel noise reduction section is used. On the other hand, when "arm motion" noise exists, WCR for the case in which the multi-channel noise reduction section is used is higher than WCR for the case in which the template subtraction noise reduction section is used.

The reason is as below. The location of the arms is separated away from the speaker that stands in front of the robot. Accordingly, when "arm motion" noise exists, noise reduction based on source separation using a multitude of microphones set on the head of the robot is performed particularly efficiently in the multi-channel noise reduction section. Further, when "leg motion" noise exists, noise reduction based on source separation using a multitude of microphones is similarly performed efficiently On the other hand, when "head motion" noise exists, the head motor noise propagates inside the head in a highly reverberant way in close proximity of the microphones. A strong noise source in the very near field of the microphones has the propagation pattern highly complicated. As a result, it deteriorates the separation quality of the source separation of the multi-channel noise reduction section.

Unlike the multi-channel noise reduction section, the template subtraction noise reduction section does not model the noise depending on its directivity-diffuseness nature, but uses prediction based on templates in the database.

Accordingly, when "head motion" noise exists, the template subtraction noise reduction section has better results than the case in which source separation is used.

As described above, when "head motion" noise exists and "head and arm motion" noise exists, the template subtraction noise reduction section is advantageously used. On the other hand, when "arm motion" noise exists, "leg motion" noise exists and a combination of them exists, the multi-channel noise reduction section is advantageously used. Accordingly, the output selecting section 127 selects output of the template subtraction noise reduction section 100 when "head motion" exists and selects output of the multi-channel noise reduction section 121 when "head motion" does not exist.

What is claimed is:

1. An acoustic data processor for processing acoustic data including signal sounds to reduce noises generated by a mechanical apparatus, comprising:

a motion status obtaining section for obtaining a motion status of the mechanical apparatus, wherein the obtained motion status comprises an n-dimensional feature vector, the n-dimensional feature vector comprises a plurality of features, and each feature of the n-dimensional feature vector corresponds to a movement of a joint motor;

an acoustic data obtaining section for obtaining acoustic data corresponding to the obtained motion status;

a database for storing templates for various motion statuses and corresponding acoustic data of the mechanical apparatus for the duration of a unit of time, wherein each stored template comprises an n-dimensional feature vector;

a database searching section for determining distances, in n-dimensional space, between the n-dimensional feature vector corresponding to the obtained motion status and the n-dimensional feature vectors corresponding to the stored templates, and searching, for each unit of time, the database using the determined distances to retrieve the template having the motion status closest to the obtained motion status; and a noise reduction section for subtracting the acoustic data of the template having the motion status closest to the obtained motion status from the obtained acoustic data to reduce noises generated by the mechanical apparatus.

2. An acoustic data processor according to claim 1, further comprising a multi-channel noise reduction section for reducing noise based on multi-channel acoustic data and an output selecting section for selecting either one of the output of the template subtraction section and the output of the multi-channel noise reduction section based on the obtained motion status.

3. An acoustic data processor according to claim 1, wherein the mechanical apparatus is a robot.

4. An acoustic data processor according to claim 3, motion status of the robot is represented by data of angle, angular velocity and angular acceleration of joint motors.

5. An acoustic data processor according to claim 4, wherein the template having the motion status closest to the obtained motion status is determined using distance in 3J dimensional space consisting of data of angle, angular velocity and angular acceleration of motors where J is the number of the motors.

6. An acoustic data processor according to claim 1, wherein acoustic data of the templates are represented by frequency spectrum.

7. An acoustic data processor according to claim 1, further comprising a database generating section for generating the database by collecting various motion statuses for the duration of a unit of time and acoustic data corresponding to the motion statuses.

8. An acoustic data processor according to claim 1, wherein the processor is used for speech recognition.

9. An acoustic data processing method for processing acoustic data including signal sounds to reduce noises generated by a mechanical apparatus, comprising the steps of:

obtaining a motion status of the mechanical apparatus, wherein the obtained motion status comprises an n-dimensional feature vector, the n-dimensional feature vector comprises a plurality of features, and each feature of the n-dimensional feature vector corresponds to a movement of a joint motor;

obtaining acoustic data corresponding to the obtained motion status;

searching, for each unit of time, the database using determined distances to retrieve a template having a motion status closest to the obtained motion status from a database for storing templates for various motion statuses and corresponding acoustic data of the mechanical apparatus for the duration of a unit of time, wherein each stored template comprises an n-dimensional feature vector, and the determined distances are distances, in n-dimensional space, between the n-dimensional feature vector corresponding to the obtained motion status and the n-dimensional feature vectors corresponding to the stored templates; and subtracting the acoustic data of the template having the motion status closest to the obtained motion status from the obtained acoustic data to obtain output of which noises generated by the mechanical apparatus are reduced.

10. An acoustic data processing method according to claim 9, further comprising the step of selecting either one of the output whose noise has been reduced by template subtraction and the output whose noise has been reduced using multi-channel acoustic data.

* * * * *